United States Patent
Kang et al.

(10) Patent No.: US 11,975,295 B2
(45) Date of Patent: May 7, 2024

(54) METHOD OF FABRICATING AND OPERATING WATER-PERMEABLE CAPACITIVE DEIONIZATION ELECTRODE CAPABLE OF SELECTIVELY ABSORBING AND DESORBING SODIUM IONS USING NASICON-INCORPORATED CARBON NANOTUBE STRUCTURE

(71) Applicant: Korea Advanced Institute of Science and Technology, Daejeon (KR)

(72) Inventors: Seoktae Kang, Daejeon (KR); Joosung Park, Daejeon (KR); Mi-Young Lee, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 863 days.

(21) Appl. No.: 16/933,913

(22) Filed: Jul. 20, 2020

(65) Prior Publication Data
US 2021/0023506 A1  Jan. 28, 2021

(30) Foreign Application Priority Data

Jul. 23, 2019  (KR) .......................... 10-2019-0089079

(51) Int. Cl.
*B01D 69/06* (2006.01)
*B01D 67/00* (2006.01)
(Continued)

(52) U.S. Cl.
CPC ......... *B01D 69/02* (2013.01); *B01D 67/0067* (2013.01); *B01D 69/06* (2013.01);
(Continued)

(58) Field of Classification Search
CPC .... B01D 67/0067; B01D 69/02; B01D 69/06; B01D 69/08; B01D 71/021;
(Continued)

(56) References Cited

U.S. PATENT DOCUMENTS

| 2012/0325737 A1* | 12/2012 | Lee | ........................ | B01D 71/32 521/189 |
| 2014/0186719 A1* | 7/2014 | Wang | ................... | H01M 4/0452 429/316 |
| 2018/0254463 A1* | 9/2018 | Sundaresan | ......... | H01M 10/486 |

FOREIGN PATENT DOCUMENTS

KR    10-2018-0093694 A    8/2018

OTHER PUBLICATIONS

Cuilian Han, et al., "Enhanced Hybrid Capacitive Deionization Performance by Sodium Titanium Phosphate/Reduced Porous Graphene Oxide Composites", ACS Omega, 4, pp. 11455-11463 (2019).
(Continued)

*Primary Examiner* — James C Goloboy
(74) *Attorney, Agent, or Firm* — Burns & Levinson LLP; Joseph M. Maraia; Marlo Schepper Grolnic

(57) ABSTRACT

Disclosed are a membrane structure including a carbon nanomaterial and NASICON-series ceramic particles, wherein an aqueous solution can pass through an electrode and a method of fabricating the same. There is disclosed a membrane structure of a flat membrane or hollow fiber membrane form, wherein the carbon nanomaterials are intertwisted to form a three-dimensional mesh-shaped structure and the NASICON-series ceramic particles material is combined with the three-dimensional mesh-shaped structure as a complex.

9 Claims, 8 Drawing Sheets

(51) Int. Cl.
    *B01D 69/02*     (2006.01)
    *B01D 69/08*     (2006.01)
    *B01D 71/02*     (2006.01)
    *C02F 1/469*     (2023.01)

(52) U.S. Cl.
    CPC ........... *B01D 69/08* (2013.01); *B01D 71/021* (2013.01); *C02F 1/4691* (2013.01); *B01D 2323/39* (2013.01); *B01D 2325/02* (2013.01); *B01D 2325/26* (2013.01)

(58) Field of Classification Search
    CPC ............ B01D 2323/39; B01D 2325/02; B01D 2325/26; C02F 1/4691
    See application file for complete search history.

(56) References Cited

OTHER PUBLICATIONS

Mingguang Wu, et al., "NASICON-Structured $NaTi_2(PO_4)_3$ for Sustainable Energy Storage", Nano-Micro Lett. 11:44, 36 pages (May 2019).
Office Action Issued in Korean Patent Application No. 10-2019-0089079 dated Oct. 7, 2020.

\* cited by examiner

METHOD OF FABRICATING AND OPERATING WATER-PERMEABLE CAPACITIVE DEIONIZATION ELECTRODE CAPABLE OF SELECTIVELY ABSORBING AND DESORBING SODIUM IONS USING NASICON-INCORPORATED CARBON NANOTUBE STRUCTURE

CROSS REFERENCE TO RELATED APPLICATION

This application claims priority under 35 U.S.C. § 119 to Korean Patent Application No. 10-2019-0089079 filed on Jul. 23, 2019, which is incorporated herein by reference in its entirety.

BACKGROUND OF THE INVENTION

1. Technical Field

Various embodiments relate to an apparatus capable of fabricating a complex of a NA super ionic conductor (NASICON)-series ceramic material and a carbon nanotube as a water-permeable electrode of a hollow fiber membrane form and selectively adsorbing sodium ions through an operation of the electrode. More specifically, various embodiments relate to the fabrication of a carbon nanotube-NASICON complex electrode having a high ion adsorption capacity and capable of being repeated used through the adsorption/desorption reaction of electrochemical sodium positive ions of a NASICON present in a carbon nanotube-NASICON complex and a method of operating a capacitive deionization process using the electrode.

2. Description of the Related Art

A common capacitive deionization process electrode is fabricated as an electrode of a two-dimensional form in which a carbon-based nanomaterial, such as activated carbon, carbon nanotube or graphene, is coated on metal foil as current collector.

An electrode having such a form may adsorb ions within an aqueous solution through a contact with the ions in the case of an electrode material present on a surface of the electrode, but may adsorb only ions that penetrate the electrode in the case of an electrode material present within the electrode, in a capacitive deionization method process. Accordingly, there are disadvantages in that only some of electrode materials present on an electrode surface actively operate and overall performance is degraded. In order to solve such problems, an electrode structure needs to be changed so that an electrolyte can flow through the inside of the electrode, and all electrode materials forming the electrode need to come in contact with and adsorb ions within the electrolyte.

Furthermore, in the case of a carbon nanomaterial, when a potential difference is applied, ions within an aqueous solution are physically adsorbed through an electric field on an electrode surface. Accordingly, an adsorption capacity is low and polyvalent ions, such as $Ca^{2+}$ or $Mg^{2+}$, are well adsorbed because adsorption occurs only on a surface of the material. However, the carbon nanomaterial has a low adsorption characteristic for a 1-valence positive ion, such as Nat, which occupies 30% or more of ions within seawater.

In order to solve the problem, research for synthesizing a metallic compound and a complex of a carbon nanomaterial and using the synthesized results as an electrode material is reported. It is expected that such materials will have a high ion removal capacity compared to a conventional carbon-based electrode because the materials can adsorb ions onto a surface and also adsorb the ions into a crystal structure through an electrochemical reaction.

A Na super ionic conductor (NASICON) is a kind of metallic compound having such a characteristic, and has been in the spotlight as a material which may be applied to various fields, such as a lithium ion battery and a sodium ion battery because the NASICON has a characteristic in that it reversibly absorbs and discharges Na ions through a selective reaction with the Na ions and also has a high ion conductivity within a crystal.

SUMMARY OF THE INVENTION

An embodiment provides a membrane structure which may be used as a positive ion adsorption electrode for a capacitive deionization process, wherein the limited delivery of ions through spreading and a reduction of a total ion adsorption capacity attributable to the pre-adsorption of polyvalent positive ions are improved by applying a water-permeable membrane structure and NASICON-series ceramic particles.

An embodiment provides a method of fabricating a complex of the carbon nanomaterial and the NASICON-series ceramic particles.

An embodiment provides a method of fabricating a membrane structure using the nanomaterial complex.

An embodiment provides a water treatment processing apparatus using an electrode flow-through type reactor including a membrane structure.

In an embodiment, there is provided a membrane structure including NASICON-series ceramic particles and a carbon nanomaterial that remove Na ions from salt water or seawater through an electrochemical reaction and being a membrane structure of a flat membrane or hollow fiber membrane form through which salt water or seawater can freely pass, wherein the carbon nanomaterials are intertwisted to form a three-dimensional (3-D) mesh-shaped structure, and the NASICON-series ceramic particles are combined with a carbon nanomaterial structure.

In an embodiment, the membrane structure for a capacitive deionization process may perform the adsorption of physical ions by an electric field and the adsorption of chemical ions by an electrochemical reaction at the same time.

In an embodiment, the membrane structure may have a specific surface area of 20 to 400 $m^2/g$.

In an embodiment, the membrane structure may include multiple pores each having a size of 1 to 100 nm.

In an embodiment, the membrane structure may include multiple nanopores and mesopores. The nanopores may have a volume of $1.00 \times 10^{-3}$ to $50.00 \times 10^{-3}$ $cm^3/g$, and the mesopores may have a volume of 0.01 to 0.50 $cm^3/g$.

In an embodiment, the carbon nanomaterial may include one or more types selected from a group consisting of a carbon nanotube, graphene, a carbon fiber, a carbon nanowire, and activated carbon.

In an embodiment, the NASICON-series ceramic particles may include one or more types selected from a group consisting of Li, Na, P, O, F, Ca, Ti, Si, Zr, Eu, V, Zn, Fe, Mn, Ni, Co, Ge, and Cr.

In an embodiment, the NASICON-series ceramic particle may have a diameter of 1 nm to 200 um in size.

Furthermore, a method of fabricating a membrane structure includes steps of a) fabricating NASICON-series ceramic particles; b) processing a solution in which the NASICON-series ceramic particles, a carbon nanomaterial, and polymers have been dispersed in a 3-D mesh-shaped structure in which the NASICON-series ceramic particles and the carbon nanomaterial are intertwisted so that the 3-D mesh-shaped structure is fixed in a membrane form; and c) removing or carbonizing the polymers through annealing.

In an embodiment, the processing process at step b) may be performed using one or more methods selected from wet spinning, electricity spinning, doctor blade coating, and dip-drawing methods.

In an embodiment, the polymer may be one or more types selected from a group consisting of polyvinyl, polystyrene, polyvinylidenefluoride, polyacryl, polyacrylonitrile, rayon or a copolymer of these polymers.

In an embodiment, the carbon nanomaterial and the carbonized polymers may be combined to form a complex through the annealing process.

Furthermore, the present disclosure provides a water treatment processing apparatus using a deionization process reactor using the membrane structure as a positive ion adsorption electrode for an electrochemical deionization process.

DETAILED DESCRIPTION

Hereinafter, embodiments of the present disclosure are described in detail with reference to the accompanying drawings. The present disclosure may be modified in various ways and may have various embodiments. Specific embodiments are hereinafter described in detail with reference to the accompanying drawings.

In describing the present disclosure, a detailed description of the known functions and constructions will be omitted if it is deemed to make the gist of the present disclosure unnecessarily vague.

An embodiment of the present disclosure provides a membrane electrode structure which maximizes high specific surface area, porosity, and electrical characteristics of a carbon nanomaterial and also includes a NA super ionic conductor (NASICON)-series ceramic material having $Na^+$ selectivity.

The membrane electrode structure according to an embodiment can solve a problem in that adsorption efficiency is reduced due to spreading, that is, a problem with a conventional capacitive deionization process electrode, can maintain positive ion adsorption performance even in an environment in which polyvalent positive ions, such a $Ca^{2+}$ or $Mg^{2+}$, are present, and can function as a separation film in a filtering process. Accordingly, the membrane electrode structure has excellent efficiency compared to a conventional technology because it can perform the separation and filtering of an aqueous solution without a separate separation process.

Hereinafter, embodiments of the present disclosure are described more specifically.

Figure 1:
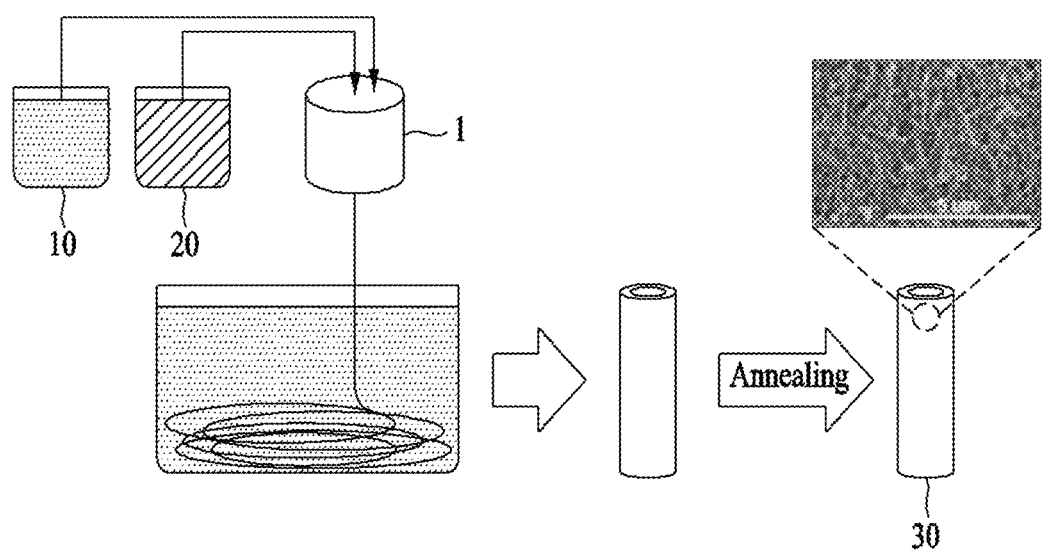
FIG. 1 diagrammatically represents a method of fabricating a membrane structure according to an embodiment of the present disclosure.

Referring to FIG. 1, according to an embodiment of the present disclosure, a membrane structure 30 of a flat membrane or hollow fiber membrane form, including a carbon nanomaterial 10 and NASICON-series ceramic particles 20, that is, a three-dimensional (3-D) mesh-shaped structure 30 in which the carbon nanomaterial and the NASICON-series ceramic particles have been intertwisted, is fabricated through a hollow fiber membrane spinning apparatus 1.

The membrane structure 30 includes the NASICON-series ceramic particles 20 and the carbon nanomaterial 10 that adsorb Na ions from salt water or seawater through an electrochemical reaction, and is formed as a membrane structure of a flat membrane or hollow fiber membrane form through which salt water or seawater can freely pass. In other words, the membrane structure 30 is a 3-D mesh-shaped structure in which the carbon nanomaterials 10 are intertwisted. The NASICON-series ceramic particles 20 are combined with the carbon nanomaterial structure 10.

Figure 2:
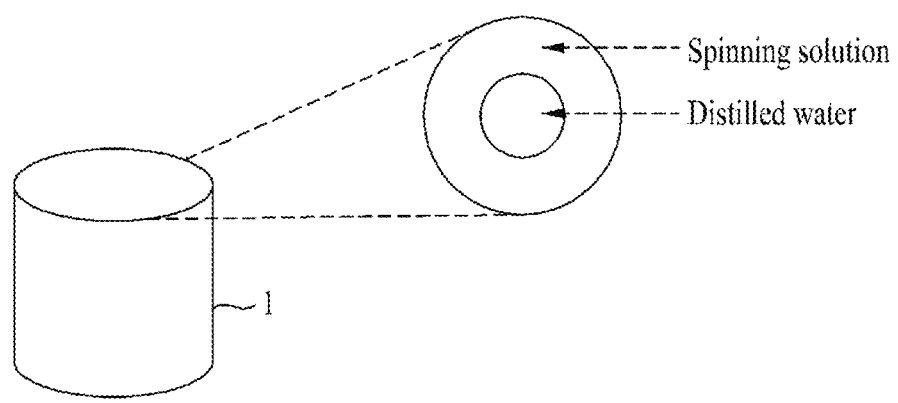
FIG. 2 diagrammatically represents a cross section of a hollow fiber membrane spinning apparatus illustrated in FIG. 1.

FIG. 2 diagrammatically represents a cross section of the hollow fiber membrane spinning apparatus 1 illustrated in FIG. 1. The hollow fiber membrane spinning apparatus 1 may include distilled water and spinning solution for forming the membrane structure 30.

In a water treatment process, the membrane structure may function as both a positive ion adsorption electrode for an electrochemical deionization process and a separation film in a film filtering process.

The membrane structure 30 is a membrane structure for a capacitive deionization process, and may simultaneously perform the adsorption of physical ions by an electric field and the adsorption of chemical ions by an electrochemical reaction.

The membrane structure 30 may have a specific surface area of 20 to 400 $m^2/g$, but the present disclosure is not limited thereto. The membrane structure may have a specific surface area of 40 to 120 $m^2/g$. If the specific surface area is less than 40 $m^2/g$, adsorption performance may be degraded. If the specific surface area exceeds 120 $m^2/g$, transmission performance may be degraded.

The membrane structure 30 may have multiple pores each having a size of 1 to 100 nm. If the size of the pore is less than 1 nm, processing speed per hour in the ion adsorption process may be reduced due to a slow moving speed of treatment water. If the size of the pore exceeds 100 nm, ion adsorption performance may be degraded.

The membrane structure 30 includes multiple nanopores and mesopores. The volume of the nanopores may be $1.00 \times 10^{-3}$ to $50.00 \times 10^{-3}$ $cm^3/g$. The volume of the mesopores may be 0.01 to 0.50 $cm^3/g$.

In the present disclosure, positive ions within source water can improve a moving speed in the membrane structure. Accordingly, ion adsorption efficiency and performance can be improved through nanopores and mesopores smaller than a membrane structure according to a conventional technology.

The carbon nanomaterial 10 may be one or more types selected from a group consisting of a carbon nanotube, graphene, a carbon fiber, a carbon nano wire, and activated carbon, but the present disclosure is not limited thereto. A carbon material used in a common water treatment process may be used as the carbon nanomaterial 10.

The NASICON-series ceramic particles 20 may be one or more types selected from a group consisting of Li, Na, P, O, F, Ca, Ti, Si, Zr, Eu, V, Zn, Fe, Mn, Ni, Co, Ge, and Cr, but the present disclosure is not limited thereto. Any type capable of reversibly adsorbing/desorbing positive ions within an aqueous solution through an electrochemical reaction may be used as the NASICON-series ceramic particles 20.

The NASICON-series ceramic particle 20 may have a diameter of 1 nm to 200 um in size. If the size of the particle is less than 1 nm, there is a possibility that the particle cannot be stably present within the membrane structure. If the size of the particle exceeds 200 um, ion adsorption efficiency may be degraded because a specific surface area of the ceramic particle is reduced.

A method of fabricating the membrane structure 30 includes steps of a) fabricating NASICON-series ceramic particles; b) processing a solution in which the NASICON-series ceramic particles, a carbon nanomaterial, and polymers have been dispersed in a 3-D mesh-shaped structure in which the NASICON-series ceramic particles and the carbon nanomaterial are intertwisted so that the 3-D mesh-shaped structure is fixed in a membrane form; and c) removing or carbonizing the polymers through annealing.

The processing process at step b) may be performed using one or more methods selected from wet spinning, electricity spinning, doctor blade coating, and dip-drawing methods, and may be the wet spinning method. Specifically, in the process, the solution in which the NASICON-series ceramic particles, the carbon nanomaterial, and the polymers have been dispersed may have a uniform thickness, and a solvent may be removed, and a form may be fixed.

At step b), the NASICON-series ceramic particles and the carbon nanomaterial may be dispersed in an organic solvent or an aqueous solvent. The organic solvent is not specially limited to any solvent if it can be used to disperse the carbon nanomaterial in the technical field to which the present disclosure pertains. N-methyl-2-pyrrolidone or dimethyl sulfoxide may be used as the organic solvent.

At step b), the polymer may be one or more types selected from a group consisting of polyvinyl, polystyrene, polyvinylidenefluoride, polyacryl, polyacrylonitrile, rayon or a copolymer of these polymers.

At step c), the carbon nanomaterial and the carbonized polymers may be combined to form a complex through the annealing process.

Figure 3:
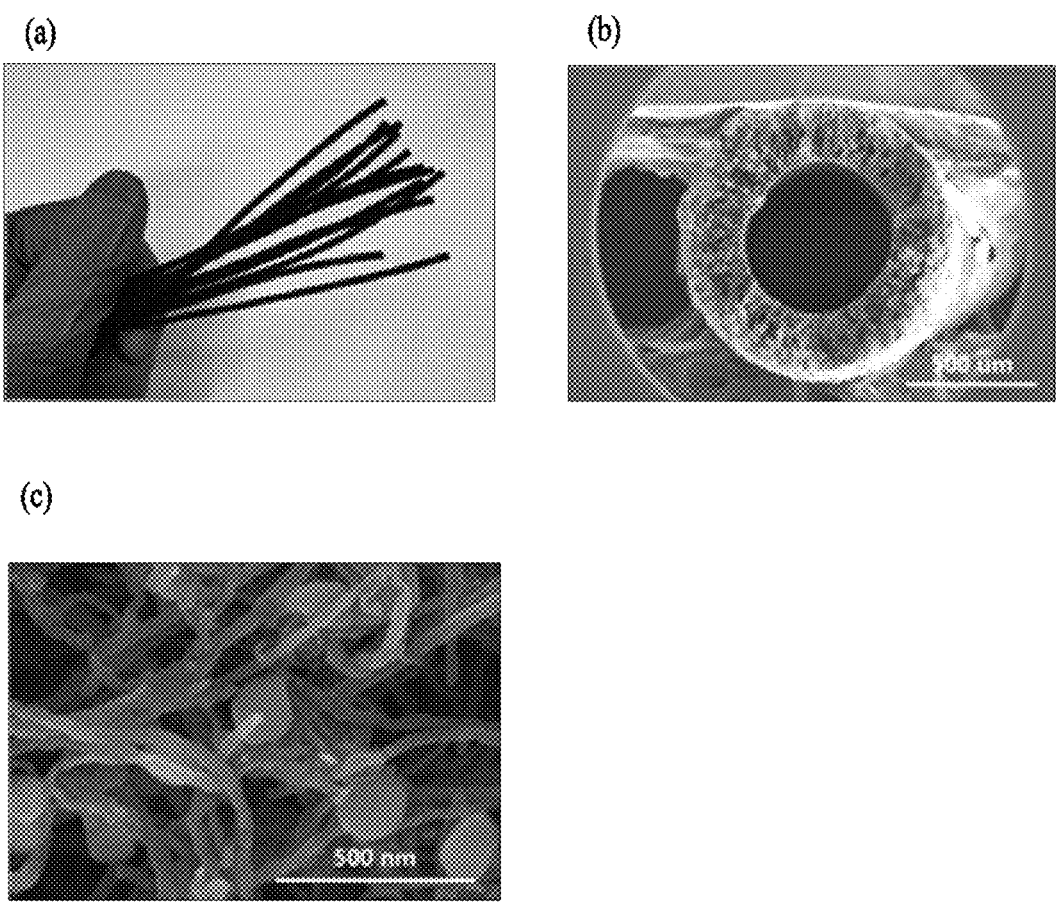
FIG. 3 shows a form and images of a membrane structure photographed by a scanning electron microscope according to an embodiment of the present disclosure.

A form of the membrane structure 30 formed by the process is shown in FIG. 3(a). FIGS. 3(b) and 3(c) show images of the membrane structure photographed by a scanning electron microscope.

An embodiment of the present disclosure provides a deionization process reactor in which the membrane structure is used as a positive ion adsorption electrode for an electrochemical deionization process, and a water treatment method using the same.

The polymers and a flammable material can be selectively removed from the membrane structure fabricated through the process of steps c).

The membrane structure 30 configured with the NASICON-series ceramic particles and the carbon nanomaterial and having a uniform thickness and water permeability is formed through the above process.

The membrane structure 30 has the aforementioned structure and characteristics.

Furthermore, an embodiment of the present disclosure provides a method of operating a capacitive deionization process using the membrane structure 30 as a positive ion adsorption electrode for the capacitive deionization process.

The reactor of the capacitive deionization process according to an embodiment is configured with a container, a power supply unit, a positive ion adsorption electrode, and a negative ion adsorption electrode.

The positive ion adsorption electrode and the negative ion adsorption electrode may have a form in which they have been disposed at given intervals. In this case, the positive ion adsorption electrode and the negative ion adsorption electrode should not directly come into contact with each other physically. The interval between the two electrodes is not specially limited.

Hereinafter, embodiments of the present disclosure are described more specifically. However, the following embodiments are examples for helping understanding of the present disclosure, and the contents of the present disclosure are not limited to the following embodiments.

Fabrication Example 1. Fabrication of $NaTi_2(PO_4)_3$—Carbon Nanotube Complex Hollow Fiber Membrane Electrode In the present fabrication example, $NaTi_2(PO_4)_3$ is selected from the NASICON-series ceramic material and fabricated as nano particles. The $NaTi_2(PO_4)_3$ nano particles are fabricated through the following synthetic process. Titanium (IV) butoxide 3.4 g and sodium acetate 0.8 g are dissolved in anhydrous ethanol of 200 mL, and thick phosphoric acid of 30 mL is then added to the dissolved solution. The fabricated solution is reacted at a temperature of 160° C. for 3 hours using a heat-resistant and pressure-resistant container. Thereafter, generated white sediments are separated from the solution. The corresponding sediments are sintered in insert gas at a temperature of 600° C. for 2 hours, thus fabricating $NaTi_2(PO_4)_3$ nano particles.

The fabricated $NaTi_2(PO_4)_3$ nano particles and a carbon nanotube are dispersed in a solution in which polymers have been dissolved to fabricate a dispersion solution ($NaTi_2(PO_4)_3$:MWCNT:PVB:NMP=1:3:2:34 (wt %)). The dispersion solution is fixed in a hollow fiber membrane form through a wet spinning process. The fabricated hollow fiber membrane is annealed in insert gas to complete an $NaTi_2(PO_4)_3$—carbon nanotube complex hollow fiber membrane electrode.

The fabricated complex hollow fiber membrane structure was analyzed to have a specific surface area of 60.28 $m^2/g$, an opening volume of 0.199 $cm^3/g$, and an average opening of 24.01 nm.

Figure 4:
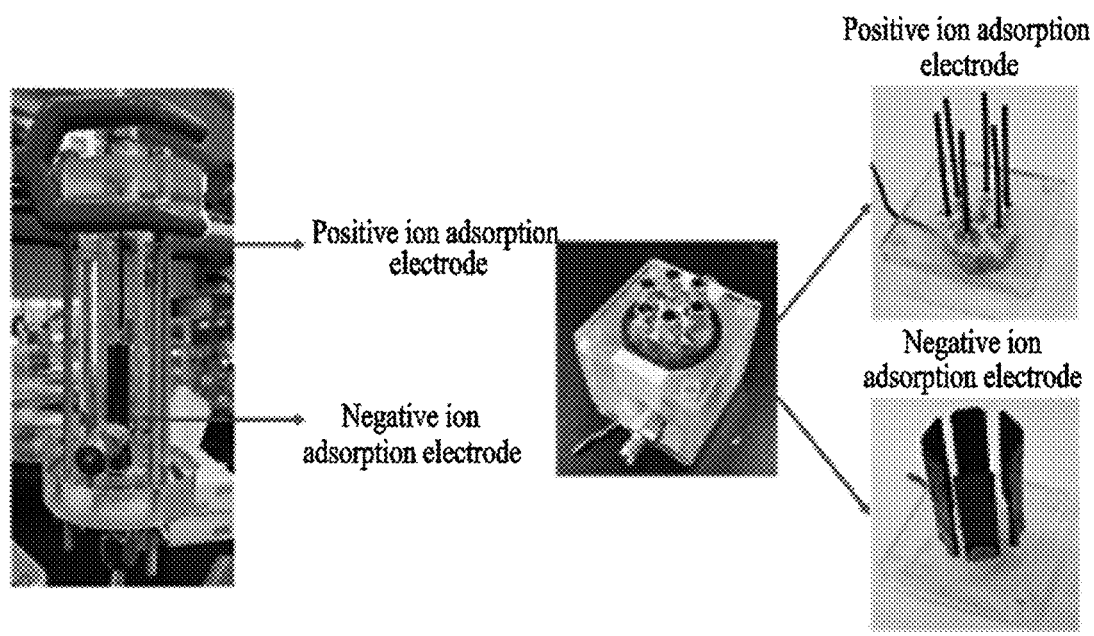
FIG. 4 illustrates photos of a water treatment processing apparatus and electrodes within the apparatus according to an embodiment of the present disclosure.

FIG. 4 illustrates photos of a water treatment processing apparatus and electrodes within the apparatus according to an embodiment of the present disclosure.

Fabrication Example 2. Fabrication 1 of a Reactor for an Electrode Water-Permeable Capacitive Deionization Process A reactor for a capacitive deionization process on which a positive ion adsorption electrode and a negative ion adsorption electrode have been mounted is fabricated using a fabricated NASICON—the carbon nanotube complex hollow fiber membrane electrode as the positive ion adsorption electrode.

Specifically, a cylindrical container having an internal volume of 10 mL is fabricated using an acrylic material. The positive ion adsorption electrode and the negative ion adsorption electrode are disposed at the top and bottom of the container, respectively. In this case, the length of the positive ion adsorption electrode is 5 cm, the length of the negative ion adsorption electrode is 5 cm×6, and the distance between the two electrodes is 1 cm.

Fabrication Example 3. Fabrication 2 of a Reactor for an Electrode Water-Permeable Capacitive Deionization Process A reactor for a capacitive deionization process on which a positive ion adsorption electrode and a negative ion adsorption electrode have been mounted is fabricated using a fabricated NASICON—carbon nanotube complex hollow fiber membrane electrode as the positive ion adsorption electrode.

Specifically, a container having an internal volume of 30 mL is fabricated using an acrylic material. The positive ion adsorption electrode and the negative ion adsorption electrode are disposed at the top and bottom of the container, respectively. In this case, the length of the positive ion adsorption electrode is 4 cm×5, the length of the negative ion adsorption electrode is 4 cm×10, and the distance between the two electrodes is 1 cm.

Embodiment 1

After an NaCl aqueous solution (pH=7) having a 100, 200, 500, 1000 mg/L concentration is fabricated, a moving fluid of 40 mL/h is made to flow from the outside of the reactor using a syringe pump. The solution penetrates the fabricated NASICON—carbon nanotube complex hollow fiber membrane electrode, fabricated according to Fabrication Example 1, by pressure generated as the NaCl aqueous solution continues to flow into the reactor, and is discharged to the outside of the reactor and collected. The positive ion adsorption electrode and the negative ion adsorption electrode are connected to the power supply unit, and experiments are performed in the state in which a voltage of 1.3 V has been applied.

Figure 5:
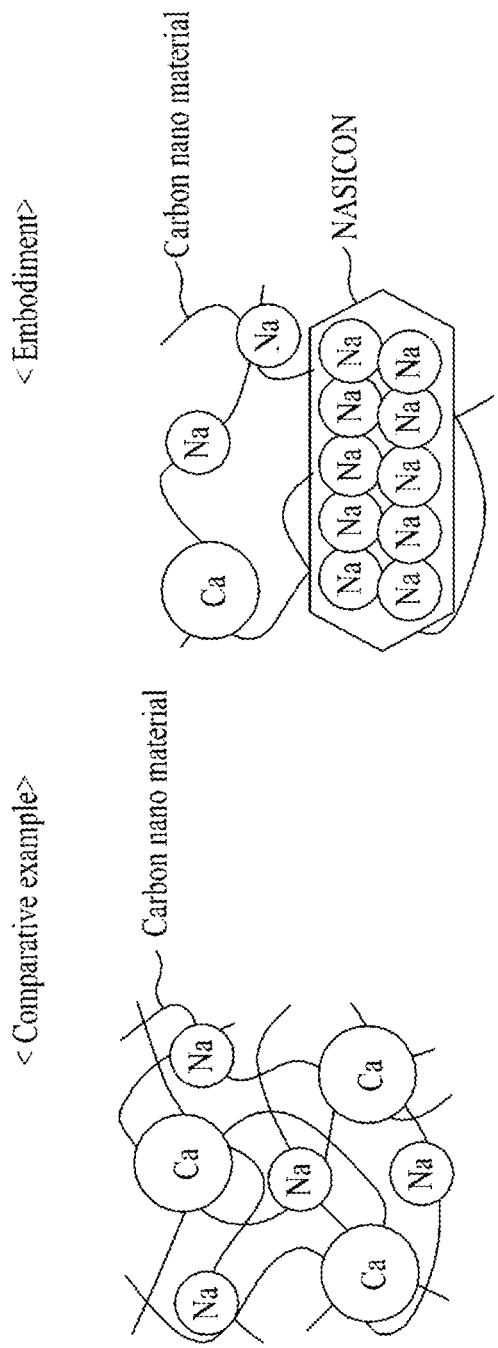
FIG. 5 diagrammatically represents a difference between positive ion adsorption characteristics within an aqueous solution according to one comparative example (carbon based electrode) of the present disclosure and an embodiment.

FIG. 5 diagrammatically represents a difference between positive ion adsorption characteristics within an aqueous solution according to one Comparative Example (single electrode of carbon) of the present disclosure and an embodiment.

Comparative Example

A dispersion solution is fabricated by dispersing a carbon nanotube into a solution in which polymers have been dissolved (MWCNT:PVB:NMP=4:2:34 (wt %)). A positive ion adsorption electrode used as a Comparative Example is fabricated as an electrode of a hollow fiber membrane form using the dispersion solution according to the method used in Fabrication Example 1. Experiments are performed on the fabricated electrode using the same apparatus and operation method as those used in Embodiment 1.

Text Example 1. Comparison Between Maximum Adsorption Capacities

Figure 6:
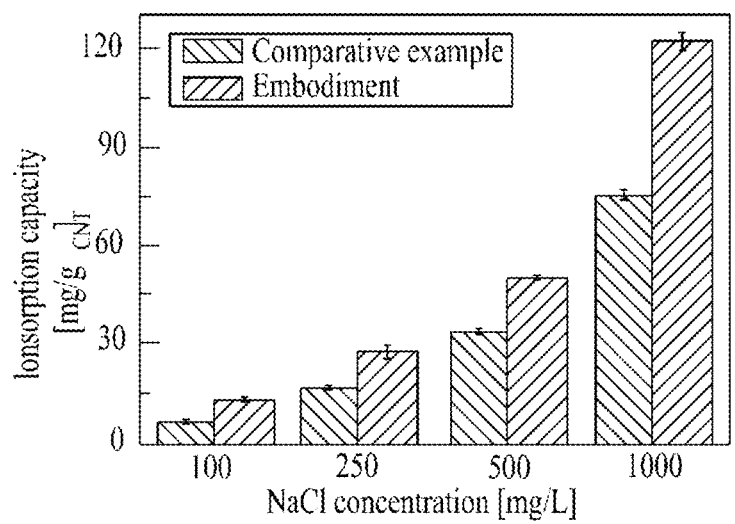
FIGS. 6 to 8 show the results of a comparison between positive ion adsorption characteristics within an aqueous solution according to one comparative example (carbon based electrode) of the present disclosure and an embodiment.

FIG. 6 shows the results of a comparison for an $Na^+$ adsorption capacity.

Maximum positive ion adsorption capacities using the electrode water-permeable capacitive deionization process reactors according to Embodiment 1 and Comparative Example were compared. The results of the comparison are illustrated in FIG. 6.

In both Embodiment 1 and Comparative Example, sampling was performed for a reaction time of 15 minutes. The sample was analyzed using an ions conductivity analysis sensor (Labquest® 2, Vernier, USA).

In Embodiment 1, a maximum adsorption capacity was 122.4 $mg_{Na}$/g in a 1000 mg/L NaCl aqueous solution because the NASICON ceramic particles additionally removed $Na^+$ ions through an electrochemical reaction. In contrast, in Comparative Example, a maximum adsorption capacity was 75.4 $mg_{Na}$/g and was merely 62% compared to Embodiment 1 without the electrochemical reaction.

Text Example 2. Comparison Between Ion Adsorption Speeds

Figure 7:
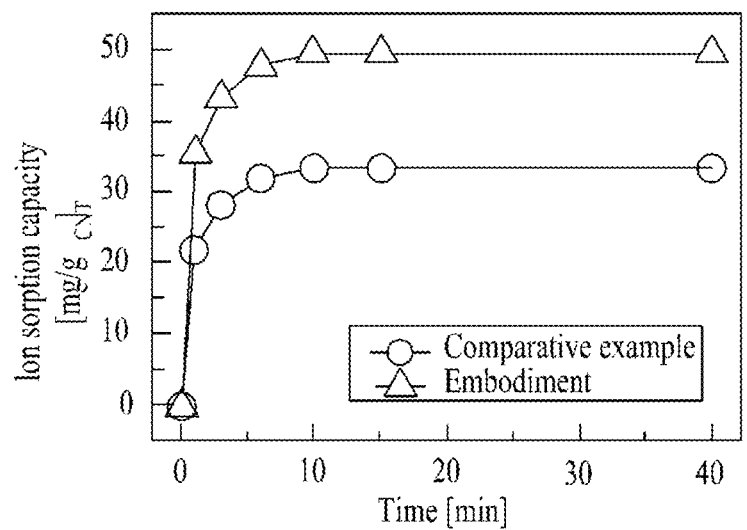

FIG. 7 shows the results of a comparison for an $Na^+$ adsorption speed.

Ion adsorption speeds using the electrode water-permeable capacitive deionization process reactors according to Embodiment 1 and Comparative Example were compared. The results of the comparison are illustrated in FIG. 7.

In both Embodiment 1 and Comparative Example, sampling was performed on a 500 mg/L NaCl solution for a reaction time of 0, 1, 3, 6, 10, 15, and 40 minutes. The sample was analyzed using the ions conductivity analysis sensor (Labquest® 2, Vernier, USA).

As a result of the operation, in both Embodiment 1 and Comparative Example, maximum positive ion adsorption capacities could be achieved in 15 minutes. It could be seen that the ion adsorption speed in Comparative Example was 62% in Embodiment 1.

Figure 8:
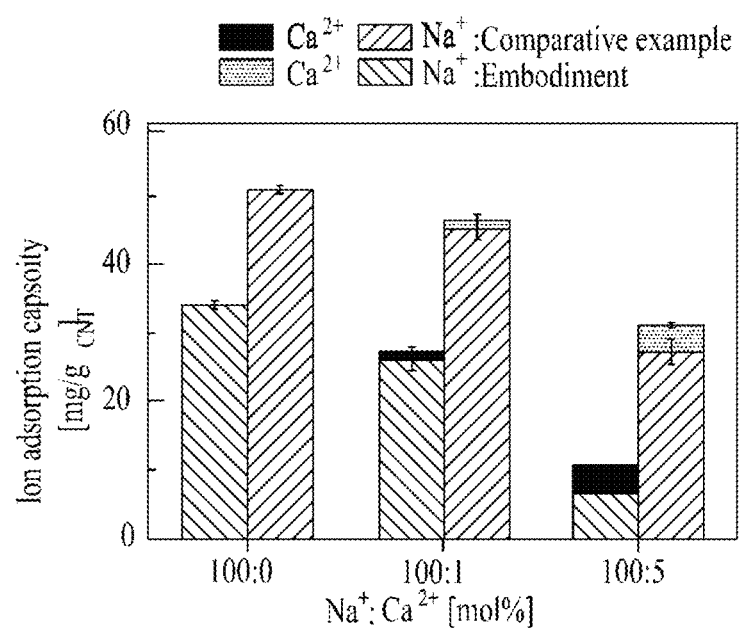

Text Example 3. Comparison Between Positive Ion Adsorption Characteristics in Environment Including $Ca^{2+}$ FIG. 8 shows the results of a comparison between positive ion adsorption characteristics within an aqueous solution including a $Na^+$ and $Ca^{2+}$ complex.

Positive ion adsorption characteristics in an environment including $Ca^{2+}$ using electrode water-permeable capacitive deionization process reactors according to Embodiment 1 and Comparative Example are compared. The results of the comparison are illustrated in FIG. 8.

In both Embodiment 1 and Comparative Example, sampling was performed on a solution in which $CaCl_2$) was added to a 500 mg/L NaCl the solution at a ratio of NaCl:$CaCl_2$=100:0, 100:1, 100:5 (mol %) for a reaction time of 15 minutes. The sample was analyzed using the ions conductivity analysis sensor (Labquest® 2, Vernier, USA) and a $Ca^{2+}$ concentration analysis kit (HS-Hardness, HUMAS, Korea).

As a result of the operation, in Embodiment 1, in an NaCl:$CaCl_2$=100:5 environment, a positive ion adsorption capacity of 61% was maintained compared to an NaCl:$CaCl_2$=100:0 environment. In contrast, in Comparative Example, a positive ion adsorption capacity had 31% in the same condition.

As described above, the membrane structure according to an embodiment is a 3-D mesh-shaped structure in which the carbon nanomaterial and NASICON-series ceramic particles have been intertwisted, and functions as a positive ion adsorption electrode for an electrochemical deionization process because it has electrical conductivity and a high specific surface area. Furthermore, the membrane structure of the present disclosure has characteristics in that it selectively adsorbs sodium ions present within an aqueous solution through the NASICON-series ceramic particles and stably operates in a condition including positive ions, such as calcium. Accordingly, the membrane structure according to an embodiment can improve a problem in that ion adsorption characteristics are degraded due to spreading and a problem in that the sodium ion adsorption capacity is reduced compared to a conventional electrode for a capacitive deionization process, and can also improve the reduction attributable to the pre-adsorption of a 2-valence or more positive ion. Furthermore, the membrane structure according to an embodiment has excellent water permeability and ion removal performance of the electrode itself because it has a porosity structure, and is advantageous in terms of the industry because a solution prior to treatment and a solution after treatment are automatically separated through the application of an electrode transmission type processing method.

The above description is merely a description of the technical spirit of the present disclosure, and those skilled in the art may change and modify the present disclosure in various ways without departing from the essential characteristic of the present disclosure.

The embodiments described in the present disclosure should not be construed as limiting the technical spirit of the present disclosure, but should be construed as describing the technical spirit of the present disclosure. The present disclosure is not restricted by the embodiments, and the range of protection of the present disclosure should be construed based on the following claims, and a full technological spirit within an equivalent range thereof should be construed as being included in the scope of rights of the present disclosure.

As described above, although the embodiments have been is described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A method of fabricating a membrane structure, comprising steps of:
    a) fabricating NA super ionic conductor (NASICON)-series ceramic particles; and
    b) forming a membrane structure of a flat membrane or hollow fiber membrane form in which the NASICON-series ceramic particles and a carbon nanomaterial have been intertwisted, wherein the membrane structure functions as a positive ion adsorption electrode for an electrochemical deionization process and a separation film for a membrane filtering process in a water treatment process.

2. The method of claim 1, wherein the step b) is performed using one or more methods selected from wet spinning, electricity spinning, doctor blade coating, and dip-drawing methods.

3. The method of claim 1, wherein the step b) comprises dispersing the NASICON-series ceramic particles and the carbon nanomaterial into an organic solvent or an aqueous solvent.

4. The method of claim 1, wherein at the step b), a solution in which the NASICON-series ceramic particles, the carbon nanomaterial, and polymers have been dispersed is processed so that the membrane structure is fixed.

5. The method of claim 4, further comprising a step c) of removing or carbonizing the polymers by annealing the membrane structure.

6. The method of claim 4, wherein the polymer comprises one or more types selected from a group consisting of polyvinyl, polystyrene, polyvinylidenefluoride, polyacryl, polyacrylonitrile, rayon or a copolymer of these polymers.

7. The method of claim 5, wherein at the step c), the carbon nanomaterial and the carbonized polymer are combined to form a complex by the annealing process.

8. The method of claim 1, wherein the carbon nanomaterial comprises one or more types selected from a group consisting of a carbon nanotube, graphene, a carbon fiber, a carbon nano wire, and activated carbon.

9. The method of claim 1, wherein the NASICON-series ceramic particle comprises one or more elements selected from a group consisting of Li, Na, P, O, F, Ca, Ti, Si, Zr, Eu, V, Zn, Fe, Mn, Ni, Co, Ge, and Cr.

* * * * *